United States Patent
Aono et al.

(10) Patent No.: US 10,209,525 B2
(45) Date of Patent: Feb. 19, 2019

(54) HEAD-UP DISPLAY DEVICE

(71) Applicants: YAZAKI CORPORATION, Tokyo (JP); TOYOTA JIDOSHA KABUSHIKI KAISHA, Toyota-shi, Aichi-ken (JP)

(72) Inventors: Hiroshi Aono, Shizuoka (JP); Jun Shihaku, Shizuoka (JP); Yasuhiro Katsumata, Shizuoka (JP); Akira Yamanaka, Shizuoka (JP); Tatsuya Saito, Shimada (JP); Kohji Matsuura, Shimada (JP); Toshiyuki Tsutsumi, Toyota (JP); Shin Funaki, Nagakute (JP)

(73) Assignees: YAZAKI CORPORATION, Minato-ku, Tokyo (JP); TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/297,364

(22) Filed: Oct. 19, 2016

(65) Prior Publication Data

US 2017/0115493 A1    Apr. 27, 2017

(30) Foreign Application Priority Data

Oct. 21, 2015    (JP) .................................. 2015-207593

(51) Int. Cl.
*G02B 27/14*    (2006.01)
*G09G 5/00*    (2006.01)
(Continued)

(52) U.S. Cl.
CPC .......... *G02B 27/0179* (2013.01); *G02B 5/10* (2013.01); *G02B 26/0816* (2013.01);
(Continued)

(58) Field of Classification Search
CPC ............ G02B 27/0172; G02B 27/0101; G02B 2027/0178; G02B 2027/0132; G02B 2027/011; G02B 27/01
(Continued)

(56) References Cited

U.S. PATENT DOCUMENTS

2005/0156815 A1    7/2005  Aoki et al.
2013/0194518 A1*   8/2013  Moussa ................ G02B 7/1821
                                                                    349/11

(Continued)

FOREIGN PATENT DOCUMENTS

JP    11028949 A  *  2/1999
JP    2005-186913 A   7/2005

*Primary Examiner* — Dawayne Pinkney
(74) *Attorney, Agent, or Firm* — Sughrue Mion, PLLC

(57) ABSTRACT

A head-up display device includes a housing, a reflecting member, a projection light emitting unit, and a vibration transmitting member. The housing is fixed to a vehicle. The reflecting member is rotatably supported by the housing and is held at a rotation position. The projection light emitting unit projects projection light corresponding to information onto a window of the vehicle through the reflecting member. The vibration transmitting member is provided between the housing and the reflecting member and has elasticity. The vibration transmitting member is fixed to the housing and makes contact with the reflecting member in an elastically compressed state in an entire rotatable range of the reflecting member.

15 Claims, 17 Drawing Sheets

(51) Int. Cl.
*H04N 7/00* (2011.01)
*G03B 21/26* (2006.01)
*G05D 1/00* (2006.01)
*G01C 21/00* (2006.01)
*G02F 1/1335* (2006.01)
*G02B 27/01* (2006.01)
*G02B 5/10* (2006.01)
*G02B 26/08* (2006.01)

(52) U.S. Cl.
CPC ..... *G02B 27/0101* (2013.01); *G02B 27/0149* (2013.01); *G02B 2027/0159* (2013.01); *G02B 2027/0181* (2013.01); *G02B 2027/0183* (2013.01)

(58) Field of Classification Search
USPC .... 359/409–410, 462, 466, 638–639, 13–14, 359/603–636, 404, 407; 348/115; 345/7, 345/9, 156; 349/11; 701/1; 310/49 R, 310/156.32, 156.33, 156.34, 156.35, 310/266–268, 156.02; 340/438, 980, 340/995.1, 815.47, 815.74
See application file for complete search history.

(56) References Cited

U.S. PATENT DOCUMENTS

2015/0286054 A1* 10/2015 Ushida ................. B60K 35/00
                                                            345/7
2016/0243942 A1*  8/2016 Sato ................... G02B 27/0149

\* cited by examiner

HEAD-UP DISPLAY DEVICE

CROSS-REFERENCE TO RELATED APPLICATION(S)

The present application claims priority to and incorporates by reference the entire contents of Japanese Patent Application No. 2015-207593 filed in Japan on Oct. 21, 2015.

BACKGROUND OF THE INVENTION

1. Field of the Invention

The present invention relates to a head-up display device.

2. Description of the Related Art

A head-up display device causes a driver to view projection light by reflecting projection light emitted from a projection light emitting unit by a reflecting member and projecting the projection light reflected by the reflecting member onto a window, for example, a windshield. The projection light is corresponding to various pieces of information such as a vehicle traveling state and an amount of the information thereof has been increasing in recent years.

The head-up display device preferably sets a position on the windshield onto which the projection light is projected, that is, a position on the windshield on which the information is displayed to a position in accordance with a height of a sight line of the driver because the height of the sight line differs depending on drivers in seated states. In view of this, a head-up display device having a configuration in which a reflecting member is supported rotatably on a housing of the head-up display device and a rotation position thereof is held has been proposed.

For example, Japanese Patent Application Laid-open No. 2005-186913 discloses such a conventional technique.

The housing of the head-up display device is fixed to a vehicle with a movable portion interposed therebetween because the reflecting member is rotatable. Looseness and allowance exist in the movable portion (for example, a portion between a rotating shaft and a bearing and a driving force transmitting mechanism of a rotating mechanism by which rotating force for rotating the reflecting member about the rotating shaft is transmitted to the reflecting member). The reflecting member does not vibrate in synchronization with vibration of the vehicle due to the looseness and allowance.

Accordingly, when the driver the sight line of which sways in synchronization with the vibration of the vehicle views information displayed on the windshield, the information seems to sway because the reflecting member vibrates in a manner different from a vibration manner of the vehicle. Visibility significantly lowers when the amount of the information that the head-up display device displays on the windshield is increased.

SUMMARY OF THE INVENTION

An object of the present invention is to provide a head-up display device capable of preventing visibility from lowering.

In order to achieve the above mentioned object, a head-up display device according to one aspect of the present invention includes a housing that is fixed to a vehicle; a reflecting member that is rotatably supported by the housing and is held at a rotation position; a projection light emitting unit that projects projection light corresponding to information onto a window of the vehicle through the reflecting member; and a vibration transmitting member that is provided between the housing and the reflecting member and has elasticity, wherein the vibration transmitting member is fixed to any one of the housing and the reflecting member and makes contact with the other one of the housing and the reflecting member in an elastically compressed state in an entire rotatable range of the reflecting member.

According to another aspect of the present invention, in the head-up display device, it is preferable that an entire region of a contact surface of the vibration transmitting member makes contact with the other one of the housing and the reflecting member in the entire rotatable range of the reflecting member.

According to still another aspect of the present invention, in the head-up display device, it is preferable that in the vibration transmitting member, when seen from a width direction of the reflecting member, a rotating axis line of a rotating shaft is located between virtual lines extending in a thickness direction of the vibration transmitting member from both of end portions of the vibration transmitting member in a direction orthogonal to the thickness direction in the entire rotatable range of the reflecting member.

According to still another aspect of the present invention, in the head-up display device, it is preferable that the reflecting member has such a curved shape that a center portion of the reflecting member in a width direction is close to the housing side relative to both of end portions when seen from a height direction of the reflecting member, and in the vibration transmitting member, when seen from the height direction of the reflecting member, a center line of the reflecting member is located between virtual lines extending in a thickness direction of the vibration transmitting member from both of end portions of the vibration transmitting member in a direction orthogonal to the thickness direction in the entire rotatable range of the reflecting member.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, an embodiment of a head-up display device (hereinafter, simply referred to as an "HUD") according to the present invention will be described in detail with reference to the accompanying drawings. This embodiment does not limit the present invention. Components in the following embodiment encompass components at which those skilled in the art could easily arrive and substantially the same components. The components in the following embodiment can be variously omitted, replaced, and changed in a range without departing from the scope of the invention.

Embodiment

Figure 1:
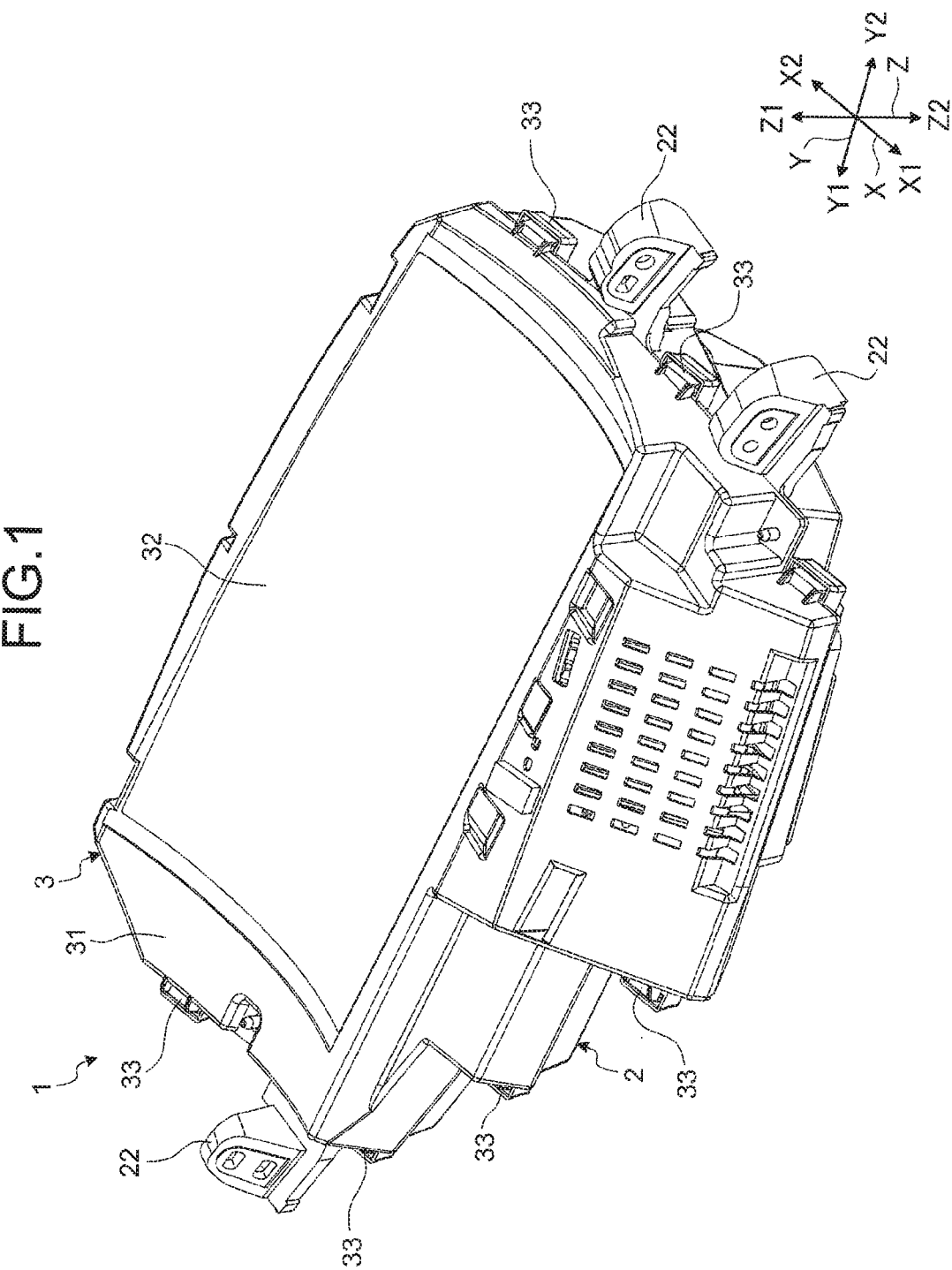
FIG. 1 is a perspective view illustrating a head-up display device according to an embodiment.
Figure 2:
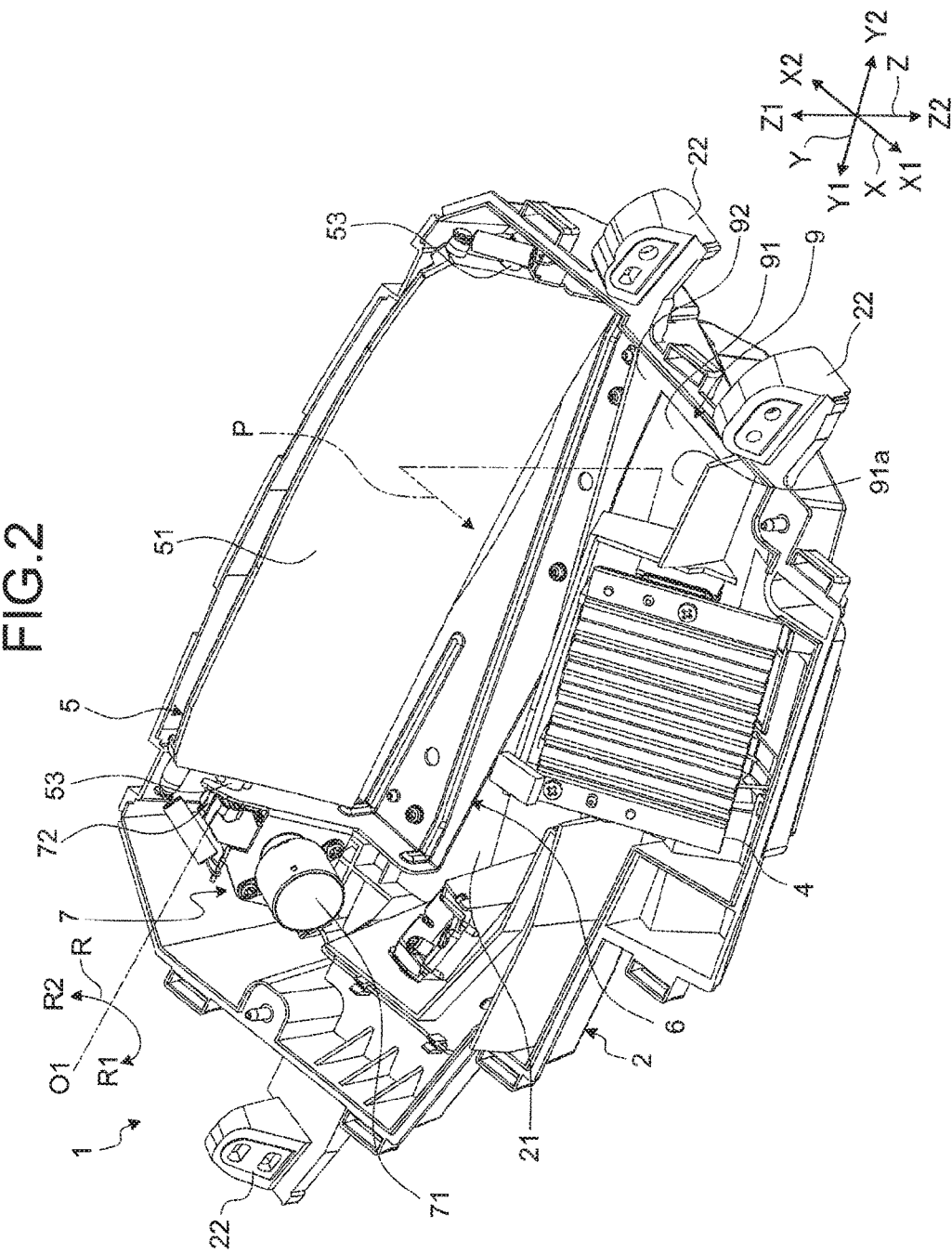
FIG. 2 is a perspective view illustrating an arrangement state of a reflecting member of the head-up display device according to the embodiment.
Figure 3:
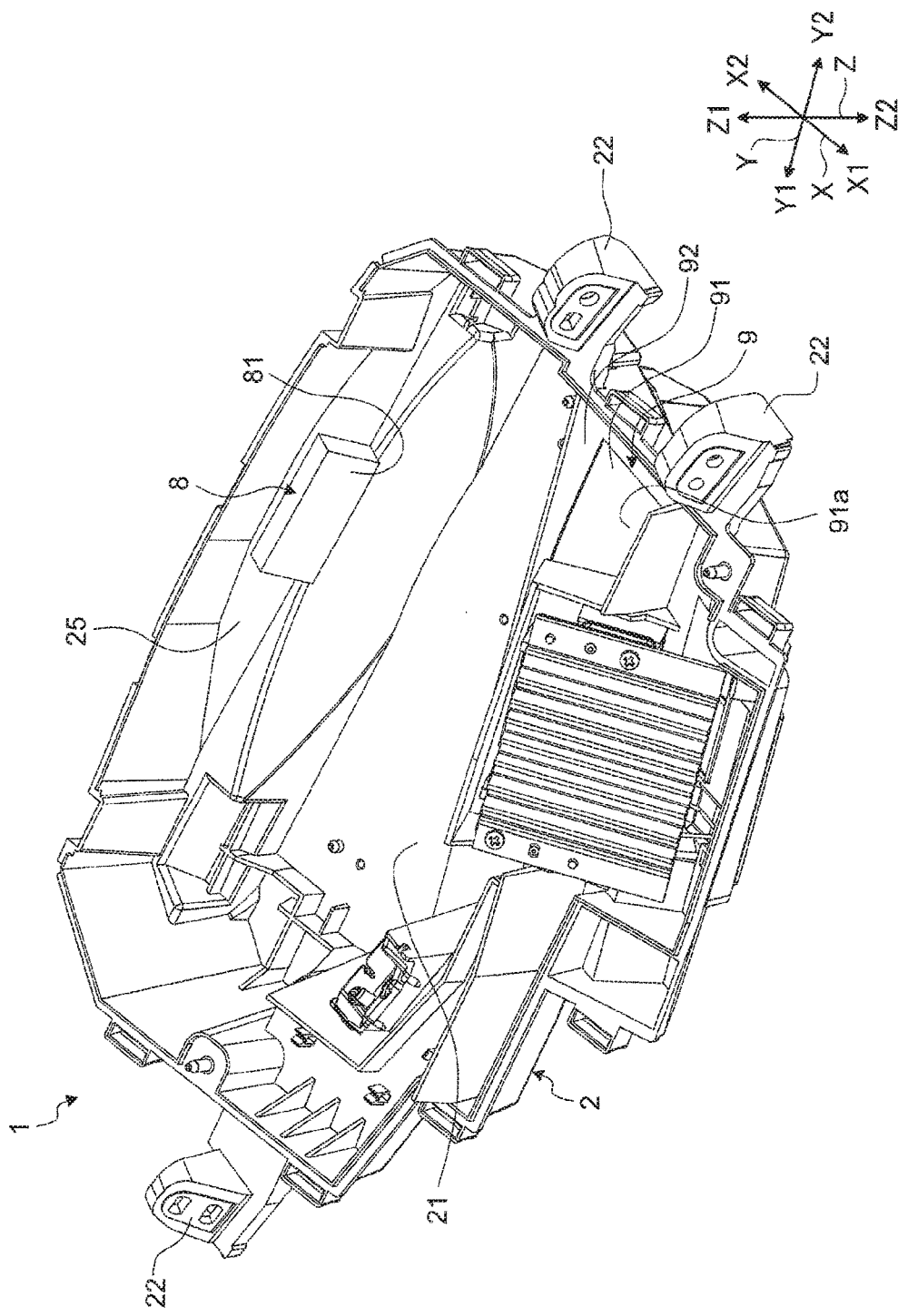
FIG. 3 is a perspective view illustrating an arrangement state of a vibration transmitting member of the head-up display device according to the embodiment.
Figure 4:
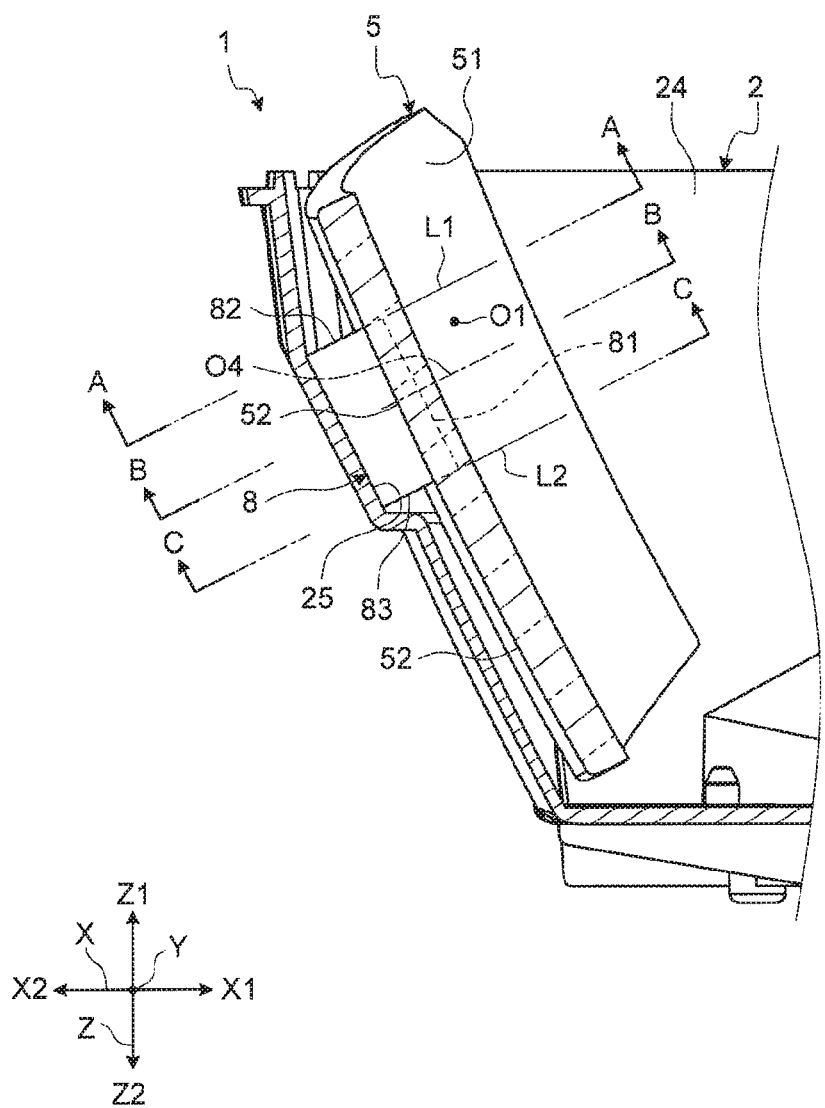
FIG. 4 is a cross-sectional view illustrating the reflecting member.
Figure 5:
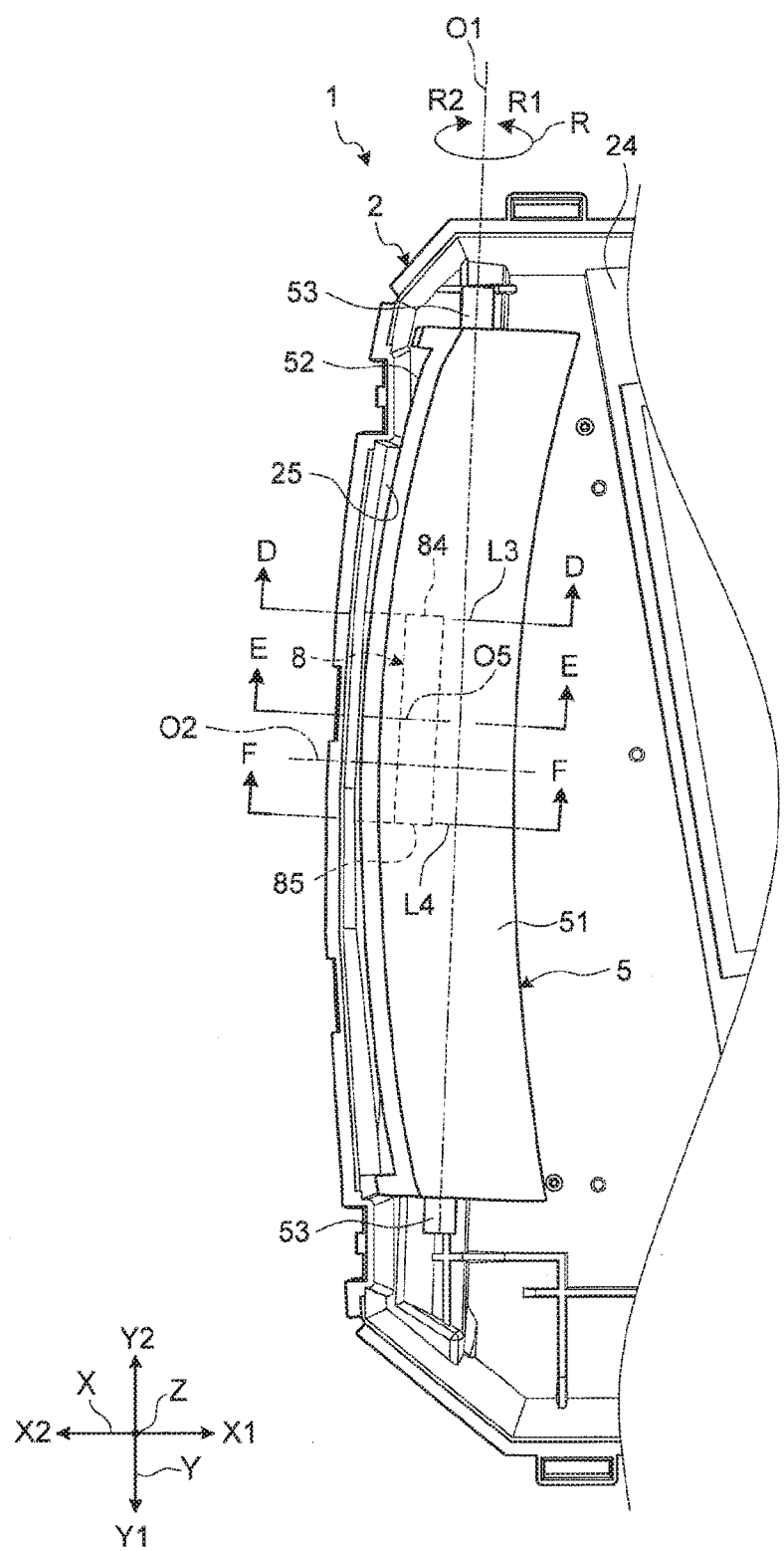
FIG. 5 is a plan view illustrating the reflecting member.
Figure 6:
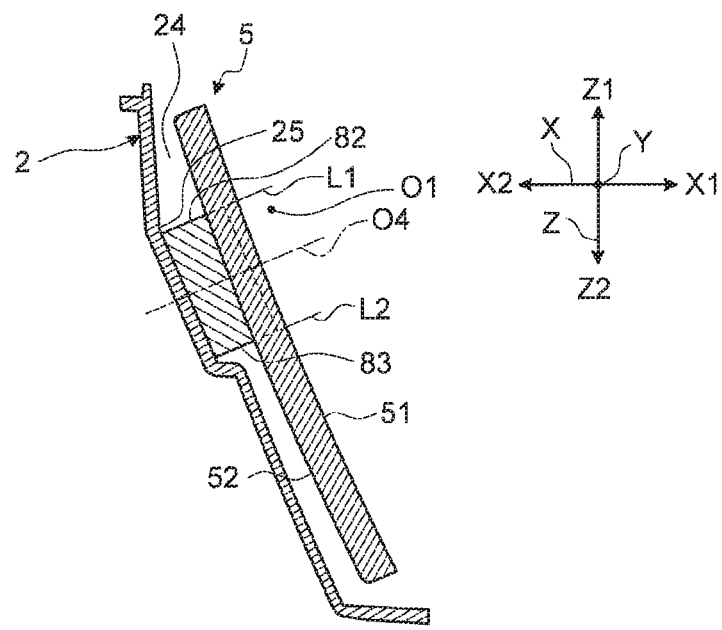
FIG. 6 is a cross-sectional view illustrating the reflecting member at a reference position.
Figure 7:
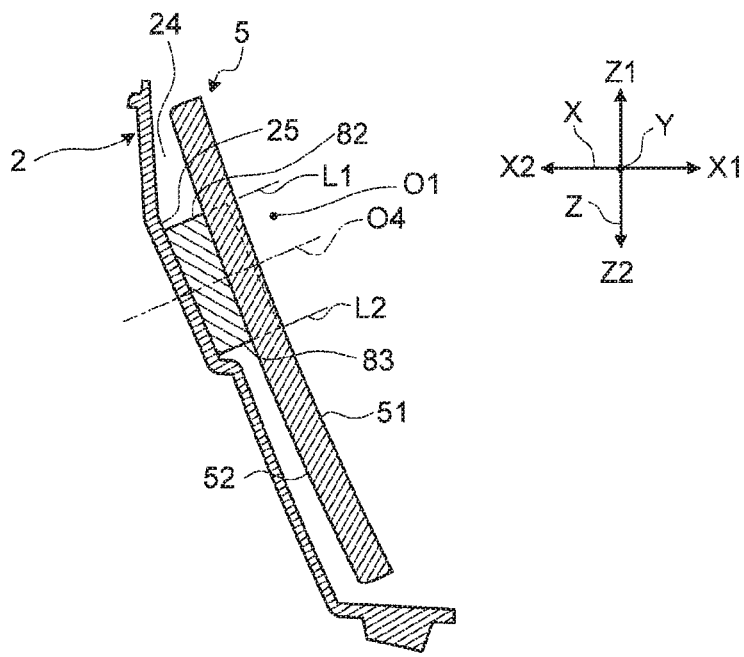
FIG. 7 is a cross-sectional view illustrating the reflecting member at the reference position.
Figure 8:
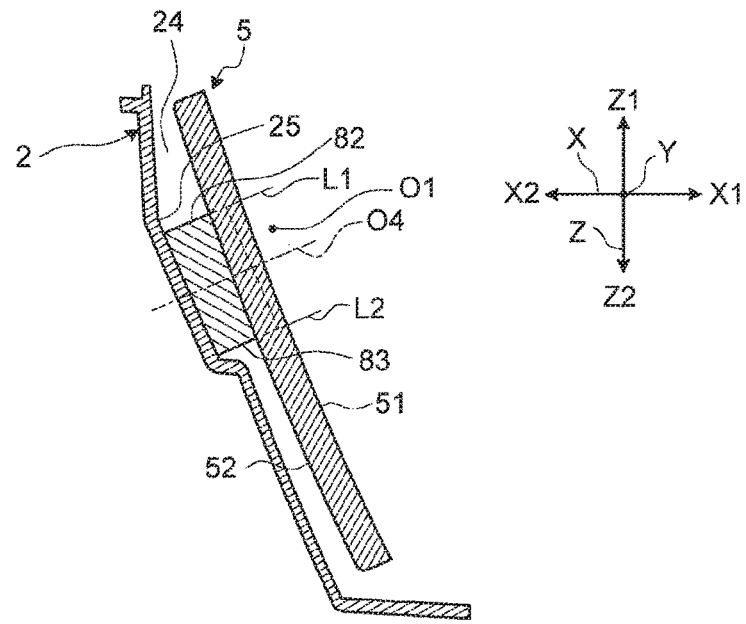
FIG. 8 is a cross-sectional view illustrating the reflecting member at the reference position.
Figure 9:
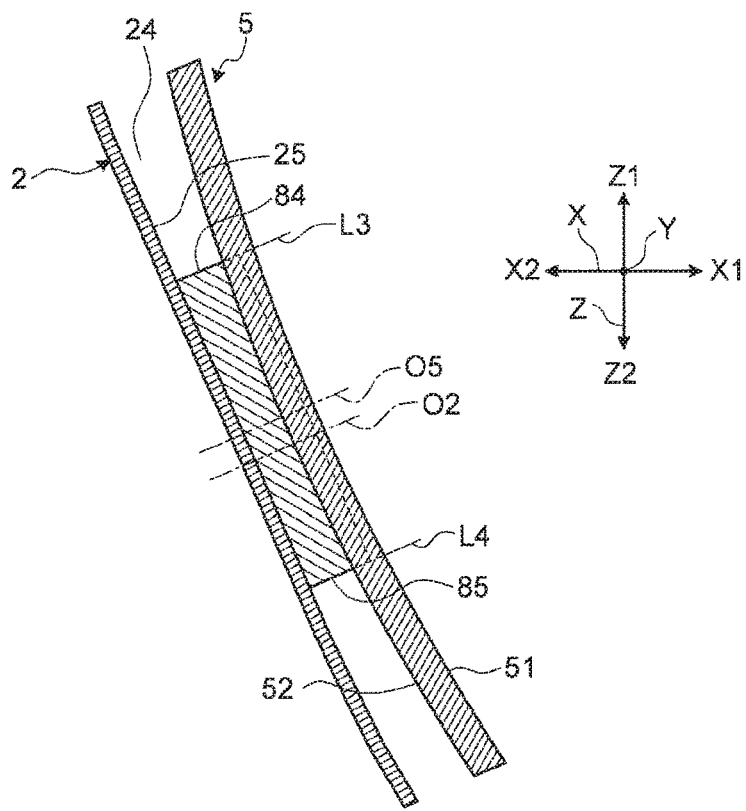
FIG. 9 is a cross-sectional view illustrating the reflecting member at the reference position.
Figure 10:
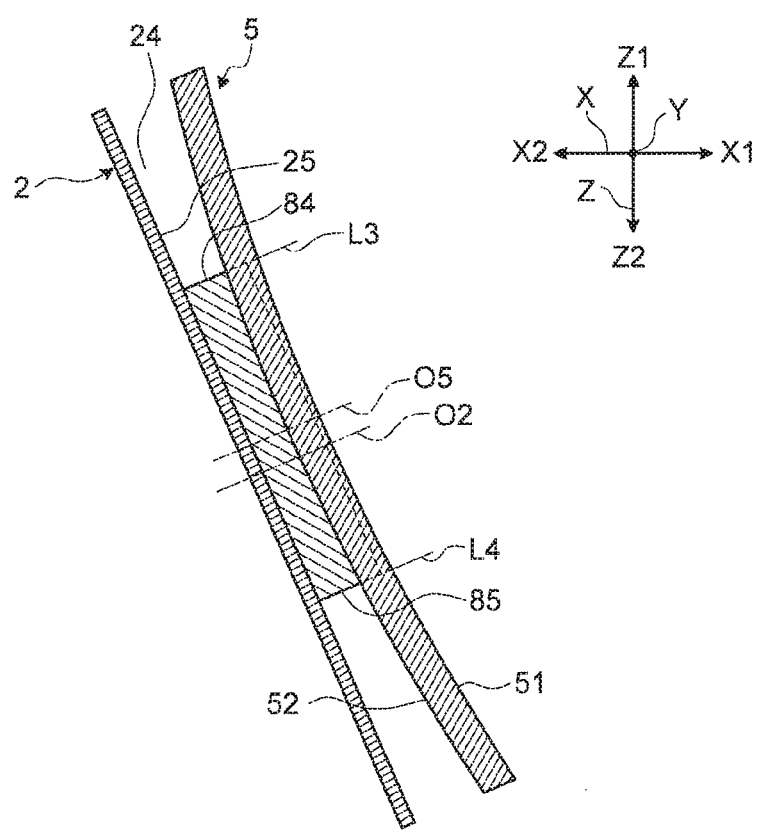
FIG. 10 is a cross-sectional view illustrating the reflecting member at the reference position.
Figure 11:
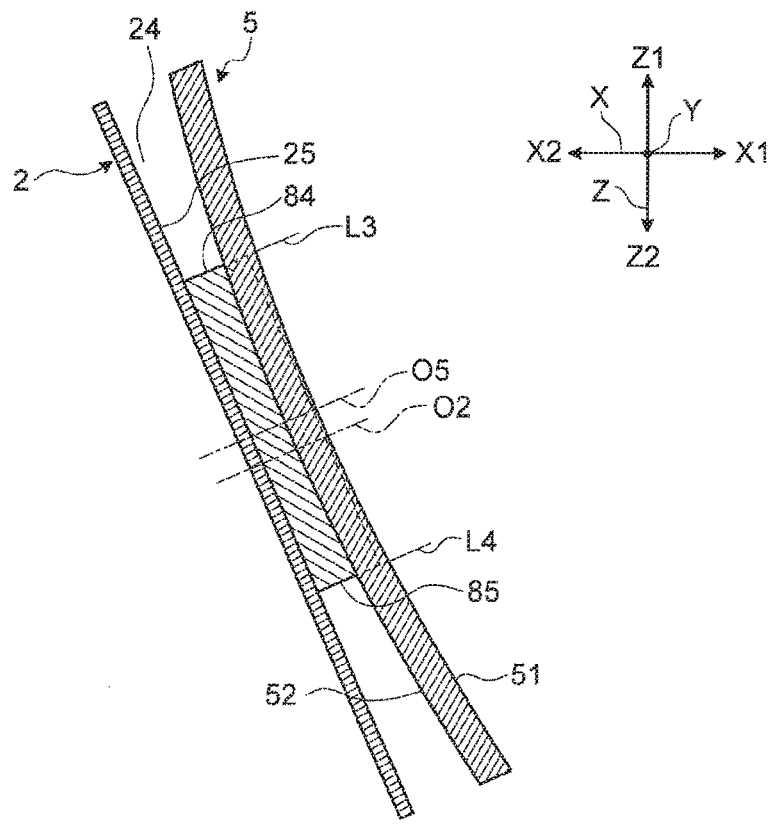
FIG. 11 is a cross-sectional view illustrating the reflecting member at the reference position.
Figure 12:
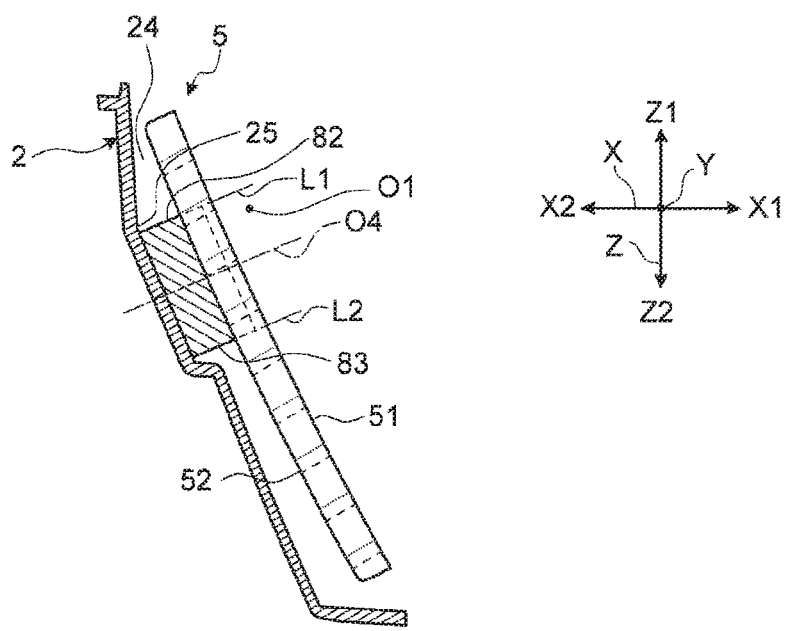
FIG. 12 is a cross-sectional view illustrating the reflecting member at a positive direction maximum position.
Figure 13:
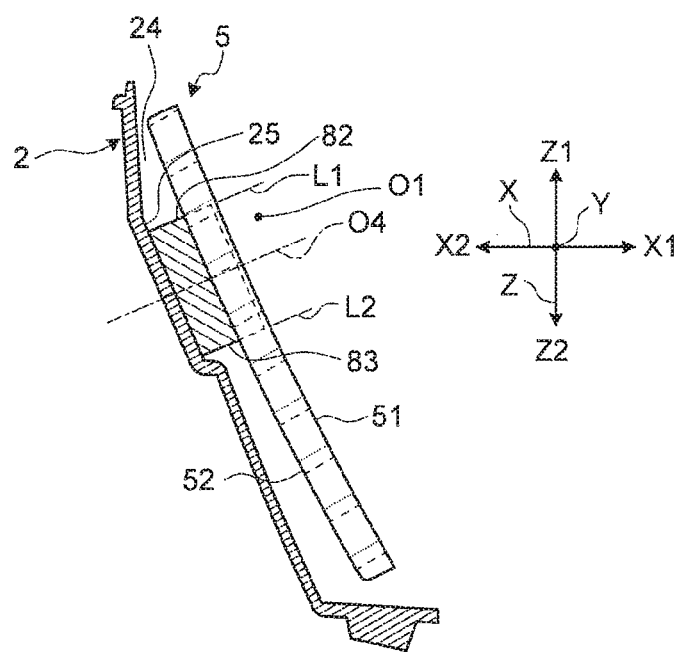
FIG. 13 is a cross-sectional view illustrating the reflecting member at the positive direction maximum position.
Figure 14:
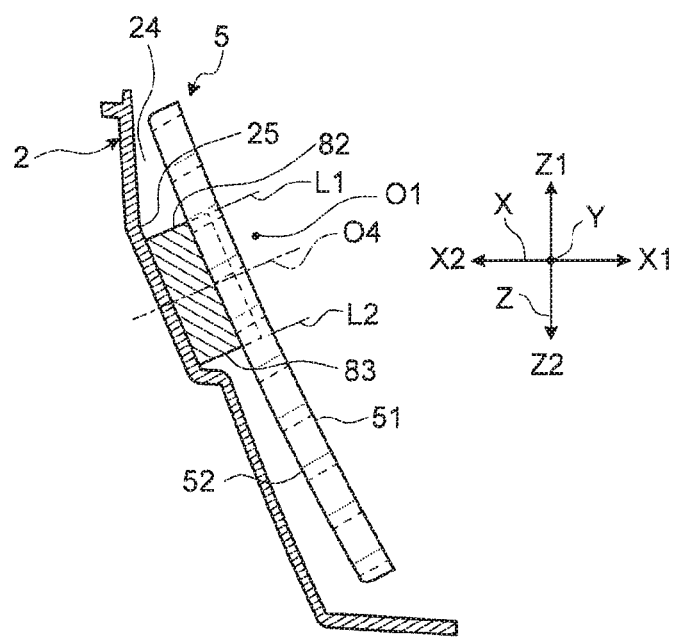
FIG. 14 is a cross-sectional view illustrating the reflecting member at the positive direction maximum position.
Figure 15:
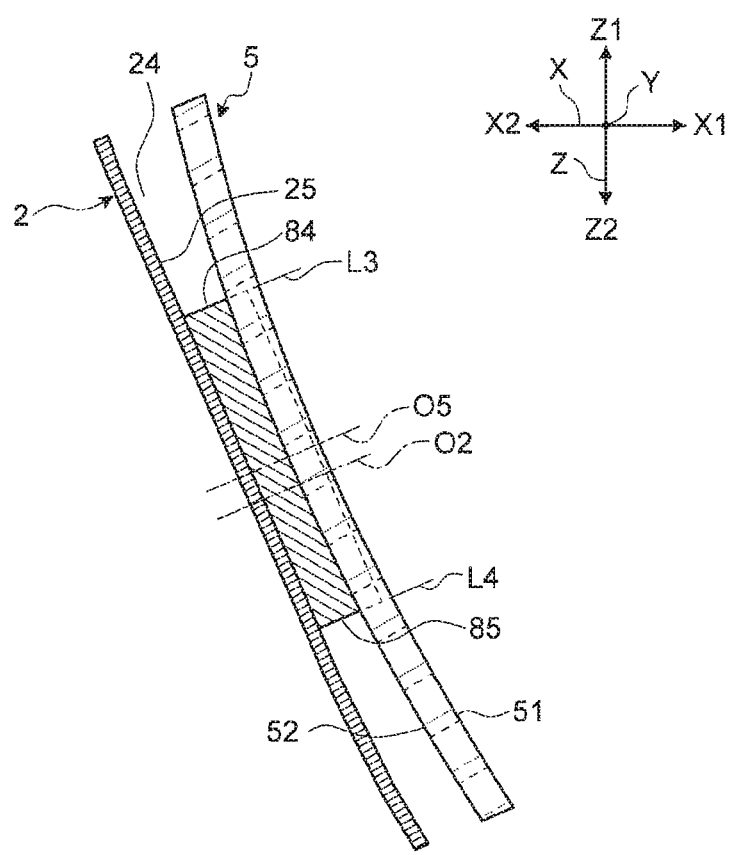
FIG. 15 is a cross-sectional view illustrating the reflecting member at the positive direction maximum position.
Figure 16:
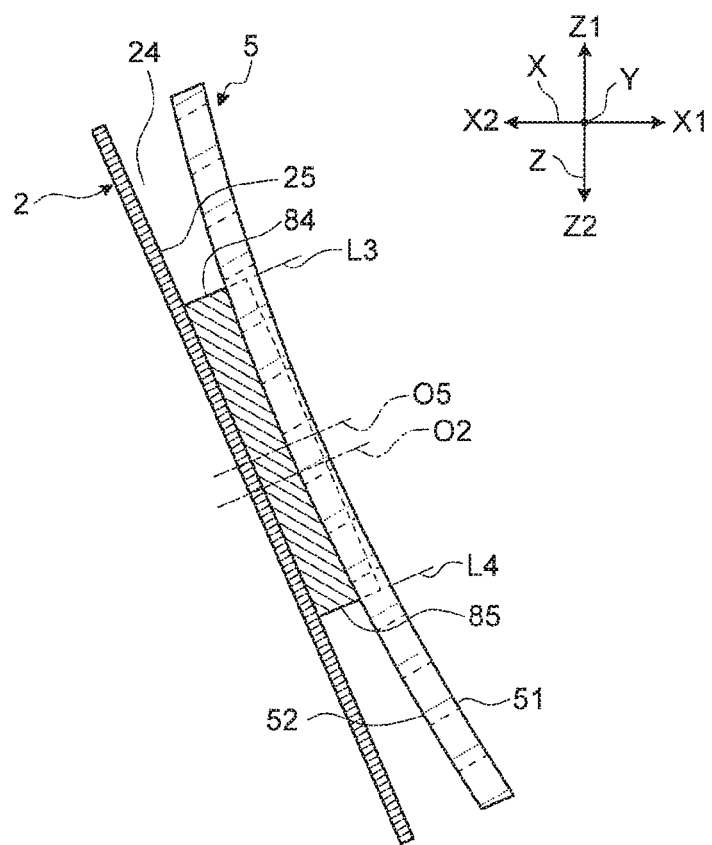
FIG. 16 is a cross-sectional view illustrating the reflecting member at the positive direction maximum position.
Figure 17:
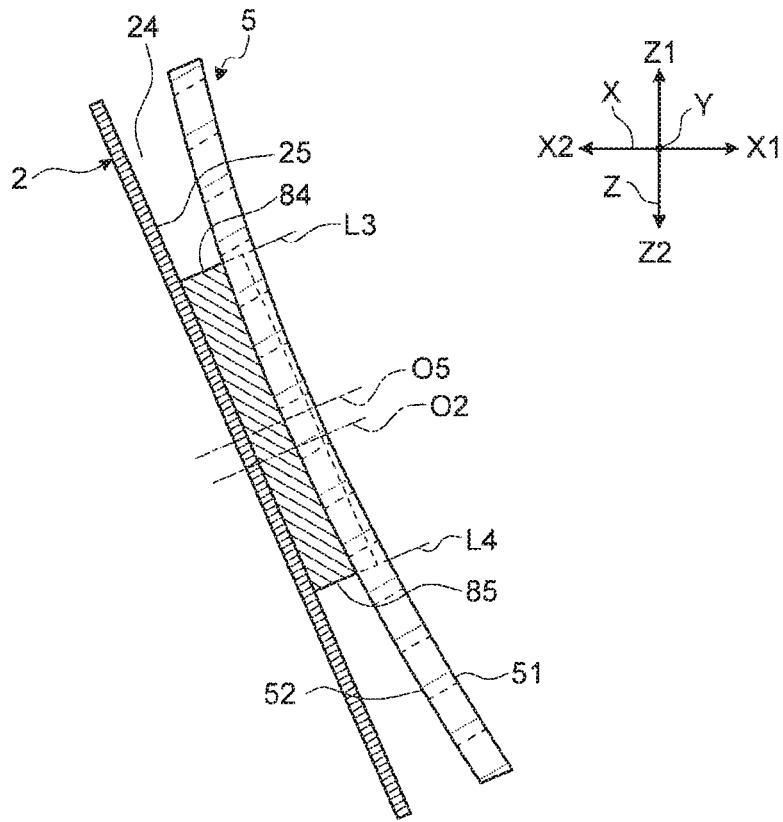
FIG. 17 is a cross-sectional view illustrating the reflecting member at the positive direction maximum position.
Figure 18:
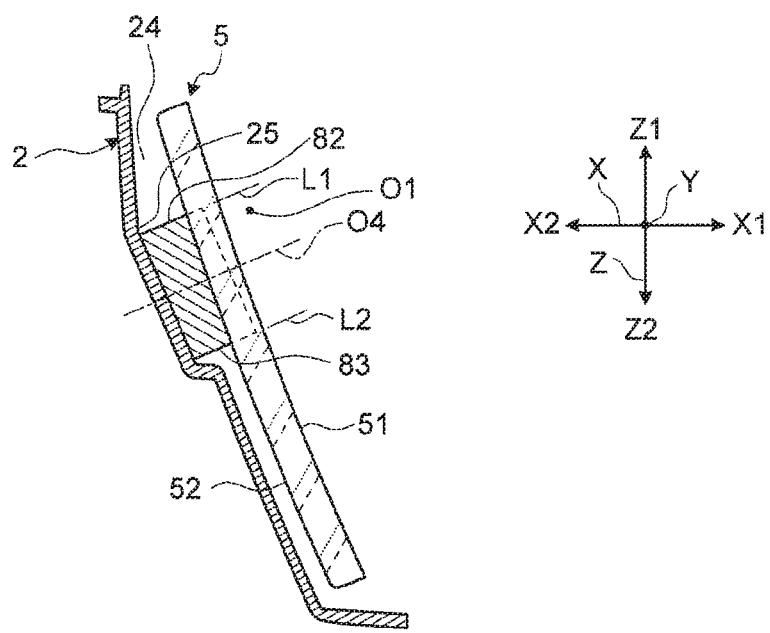
FIG. 18 is a cross-sectional view illustrating the reflecting member at a negative direction maximum position.
Figure 19:
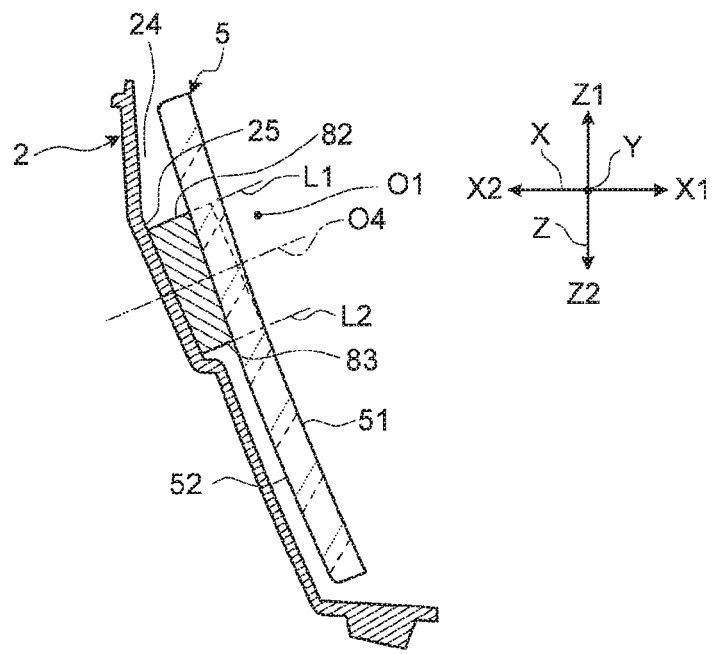
FIG. 19 is a cross-sectional view illustrating the reflecting member at the negative direction maximum position.
Figure 20:
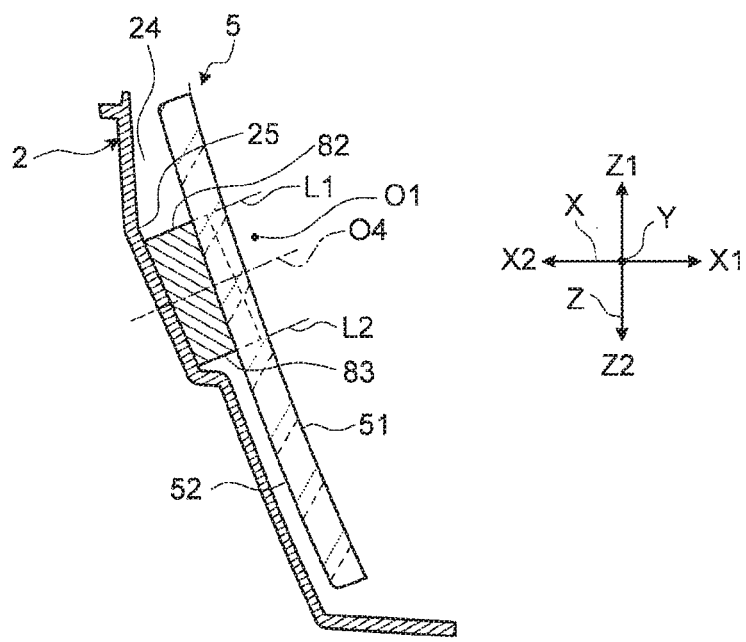
FIG. 20 is a cross-sectional view illustrating the reflecting member at the negative direction maximum position.
Figure 21:
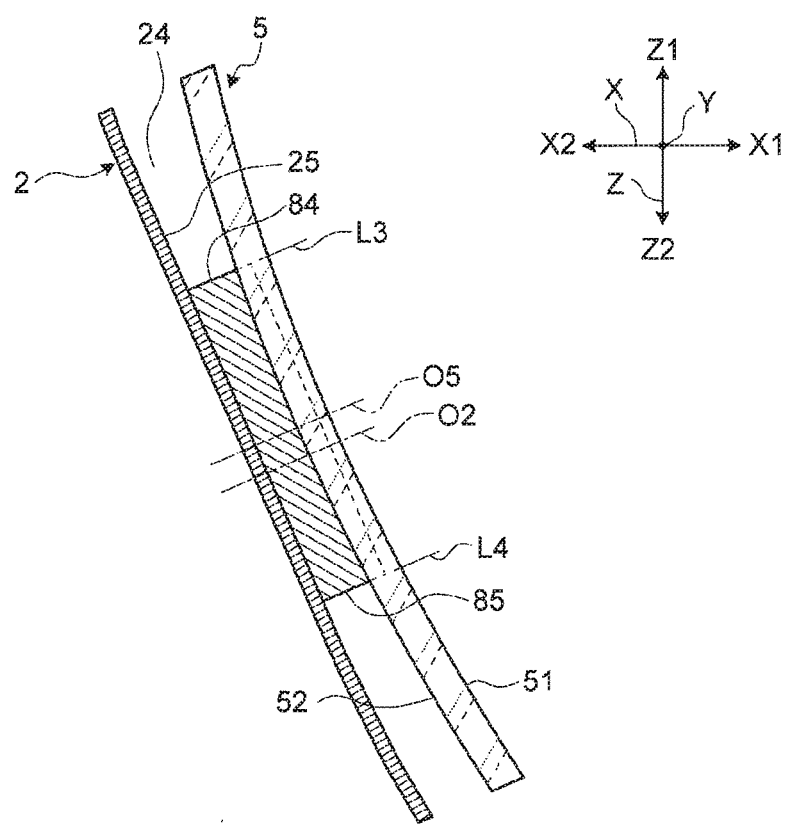
FIG. 21 is a cross-sectional view illustrating the reflecting member at the negative direction maximum position.
Figure 22:
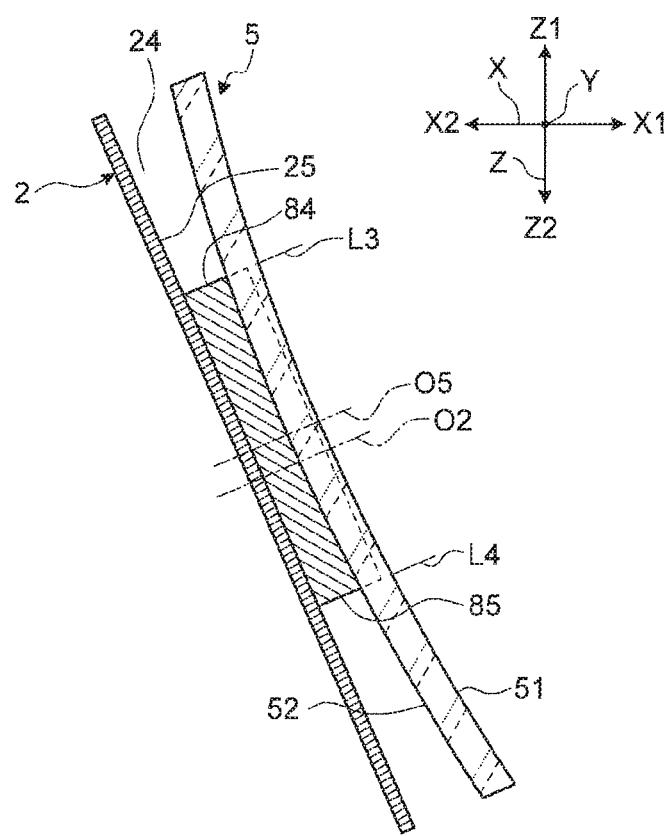
FIG. 22 is a cross-sectional view illustrating the reflecting member at the negative direction maximum position.
Figure 23:
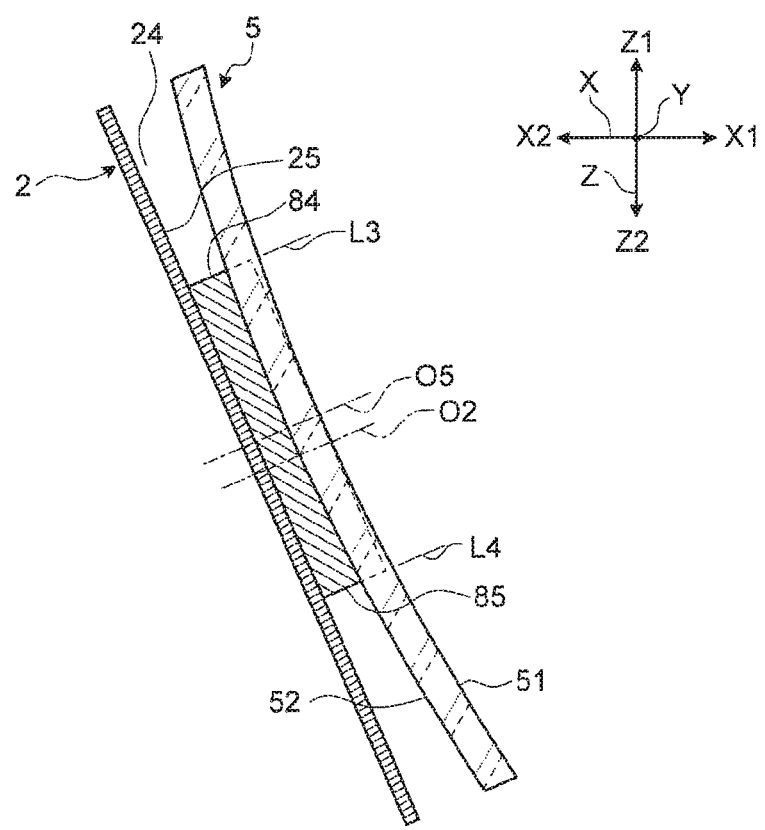
FIG. 23 is a cross-sectional view illustrating the reflecting member at the negative direction maximum position.

An HUD according to an embodiment will be described. FIG. 1 is a perspective view illustrating the head-up display device according to the embodiment. FIG. 2 is a perspective view illustrating an arrangement state of a reflecting member of the head-up display device according to the embodiment. FIG. 3 is a perspective view illustrating an arrangement state of a vibration transmitting member of the head-up display device according to the embodiment. FIG. 4 is a cross-sectional view illustrating the reflecting member. FIG. 5 is a plan view illustrating the reflecting member. FIG. 6 to FIG. 11 are cross-sectional views illustrating the reflecting member at a reference position. FIG. 12 to FIG. 17 are cross-sectional views illustrating the reflecting member at a positive direction maximum position. FIG. 18 to FIG. 23 are cross-sectional views illustrating the reflecting member at a negative direction maximum position. FIG. 6 is a cross-sectional view cut along line D-D in FIG. 5 when a reflecting member 5 is seen in the width direction from an end portion 84. FIG. 7 is a cross-sectional view cut along line E-E in FIG. 5 when a vibration transmitting member 8 is seen in the width direction from a center line O5 in the width direction. FIG. 8 is a cross-sectional view cut along line F-F in FIG. 5 when the reflecting member 5 is seen in the width direction from an end portion 85. FIG. 9 is a cross-sectional view cut along line A-A in FIG. 4 when the reflecting member 5 is seen in the height direction from an end portion 82. FIG. 10 is a cross-sectional view cut along line B-B in FIG. 4 when seen in the height direction from a center line O4 of the vibration transmitting member 8 in the height direction. FIG. 11 is a cross-sectional view cut along line C-C in FIG. 4 when the reflecting member 5 is seen in the height direction from an end portion 83. FIG. 12 and FIG. 18 are cross-sectional views (equivalent to the cross-sectional view cut along line D-D) corresponding to FIG. 6. FIG. 13 and FIG. 19 are cross-sectional views (equivalent to the cross-sectional view cut along line E-E) corresponding to FIG. 7. FIG. 14 and FIG. 20 are cross-sectional views (equivalent to the cross-sectional view cut along line F-F) corresponding to FIG. 8. FIG. 15 and FIG. 21 are cross-sectional views (equivalent to the cross-sectional view cut along line A-A) corresponding to FIG. 9. FIG. 16 and FIG. 22 are cross-sectional views (equivalent to the cross-sectional view cut along line B-B) corresponding to FIG. 10. FIG. 17 and FIG. 23 are cross-sectional views (equivalent to the cross-sectional view cut along line C-C) corresponding to FIG. 11. An X-direction in FIG. 1 to FIG. 23 is the front-rear direction of an HUD 1 according to the present embodiment. A Y-direction is the width direction of the HUD 1 according to the present embodiment, is orthogonal to the front-rear direction, and is the width direction of the reflecting member 5 and the vibration transmitting member 8. A Z-direction is the up-down direction of the HUD 1 according to the present embodiment and is the direction orthogonal to the front-rear direction and the width direction. An X1-direction is the frontward direction of the HUD 1 and an X2-direction is the rearward direction of the HUD 1. A Y1-direction is the leftward direction of the HUD 1, the reflecting member 5, and the vibration transmitting member 8 and a Y2-direction is the rightward direction of the HUD 1, the reflecting member 5, and the vibration transmitting member 8. A Z1-direction is the upward direction of the HUD 1 and a Z2-direction is the downward direction of the HUD 1. An R-direction is the rotation direction of the reflecting member 5 and is the direction about a rotating axis line O1. An R1-direction is the positive direction and is the rotation direction in which the lower side of the reflecting member 5 is separated from a housing 2. An R2-direction is the negative direction and is the rotation direction in which the lower side of the reflecting member 5 is close to the housing 2.

The head-up display device (hereinafter, simply referred to as "HUD") in the present invention is mounted on a vehicle (not illustrated) and displays information on a window (not illustrated), for example, a windshield as a front window of the vehicle. The HUD is accommodated in an instrument panel (not illustrated) of the vehicle. The HUD projects projection light P (an alternate long and short dash line in FIG. 2) onto the windshield through a transmitting portion (for example, opening). The transmitting portion is formed on a portion of the instrument panel that opposes the windshield and transmits the projection light P. As illustrated in FIG. 1 to FIG. 3, the HUD 1 includes the housing 2, a projection light emitting unit 4, the reflecting member 5, the vibration transmitting member 8, a cover 3, a supporting member 6, a rotating force generating mechanism 7, and a planar mirror 9.

The housing 2 is fixed to the vehicle and accommodates the projection light emitting unit 4, the reflecting member 5, the supporting member 6, the rotating force generating mechanism 7, the vibration transmitting member 8, and the planar mirror 9 in an internal space 24. The housing 2 according to the embodiment is made of synthetic resin and is formed into a box shape having an opening formed at the upper side that communicates with the internal space 24. The housing 2 includes one or more fixing portions, for example, three fixing portions 22 formed on the outer circumference thereof. The housing 2 is fixed to a vehicle structure (not illustrated) of the vehicle, for example, the instrument panel with fixing tools (not illustrated) such as bolts in the respective fixing portions 22. The inner wall surfaces forming the internal space 24 of the housing 2 are subjected to emboss processing and coating, thereby reducing a light reflection amount. These pieces of processing can prevent disturbance light from being incident on the projection light emitting unit 4 and being incident on the windshield together with the projection light P even when the disturbance light is incident into the internal space 24.

The cover 3 makes the internal space 24 of the housing 2 into a closed space and is arranged at the upper side of the housing 2 as illustrated in FIG. 1. The cover 3 is a lid-like member and includes a main body portion 31 and a transmitting portion 32. The main body portion 31 is made of synthetic resin and closes the opening of the housing 2. The main body portion 31 is locked to the housing 2 with one or more locking mechanisms, for example, six locking mechanisms 33. The transmitting portion 32 transmits the projection light P emitted from the projection light emitting unit 4 and outputs the projection light P to the outside of the HUD. The transmitting portion 32 is made of transparent or translucent synthetic resin and is inserted into an opening formed in the main body portion 31 to be fixed.

The projection light emitting unit 4 emits the projection light P corresponding to information. The projection light emitting unit 4 according to the embodiment emits, toward the reflecting member 5, the projection light P that enables pieces of information advantageous to a passenger, for example, the driver, such as vehicle traveling state information, guide information till arrival of the vehicle at a destination, and external environment information to be displayed on the windshield. The projection light emitting unit 4 is formed by a liquid crystal display with a spontaneous light emitting device (for example, a field emission (FE) display, a fluorescent display tube, and electroluminescence (EL)) or a backlight. A controller (not illustrated) controls the projection light emitting unit 4 to emit the projection light P corresponding to the information that is displayed on the windshield.

The planar mirror 9 is provided between the projection light emitting unit 4 and the reflecting member 5 and reflects the projection light P emitted from the projection light emitting unit 4 toward the reflecting member 5. The planar mirror 9 is mounted on a lower portion, that is, a bottom surface portion in the internal space 24 of the housing 2, and includes a mirror body 91 and a mirror cover portion 92. The mirror body 91 totally reflects the projection light P and is formed to have a flat rectangular shape. A reflecting surface 91a thereof that reflects the projection light is exposed to the internal space 24. The mirror cover portion 92 covers a part of the reflecting surface 91a of the mirror body 91. The mirror cover portion 92 according to the embodiment covers the vicinity of the outer circumference of the mirror body 91, that is, the vicinity of the outer edge of the reflecting surface 91a and therefore restricts exposure of this portion to the internal space 24. The shape of the projection light P emitted from the projection light emitting unit 4 has, for example, a curved band-like shape such that the shape of the projection light P to be displayed on the windshield is substantially rectangle (including rectangle) corresponding to the shape of a projection surface (not illustrated) of the windshield. The mirror cover portion 92 covers a part of the reflecting surface 91a so that only a region of the reflecting surface 91a the shape of which corresponds to the shape of the projection light P is exposed to the internal space 24. This configuration prevents disturbance light from being incident into the internal space 24, being reflected on the reflecting surface 91a, and being incident on the projection light emitting unit 4, and prevents the disturbance light from being incident on the windshield together with the projection light P.

The reflecting member 5 reflects the projection light P emitted from the projection light emitting unit 4. The reflecting member 5 is arranged oppose to the projection light emitting unit 4 in the internal space 24 and is provided on an optical axis of the projection light P emitted from the projection light emitting unit 4 through the planar mirror 9. The reflecting member 5 according to the embodiment is a mirror and is formed to have a substantially rectangle shape. As illustrated in FIG. 5, the reflecting member 5 is formed to have such a curved shape that a center portion of the reflecting member 5 in the width direction is closer to the housing (opposing surface 25) side than both of end portions thereof when seen from the height direction of the reflecting member 5. The reflecting member 5 is formed to have the curved shape that makes it closest to the housing 2 side on a center line O2 (line passing through the center of the reflecting member 5 in the width direction) when seen from the height direction of the reflecting member 5. The reflecting member 5 includes a reflecting surface 51 formed at one side of the reflecting member 5 in the thickness direction, that is, at the front side of the HUD 1. For example, the reflecting surface 51 is a reflecting film formed on the front surface of a base member that forms the reflecting member 5 and is made of synthetic resin. The reflecting surface 51 is formed on the front surface of the base member by metal vapor deposition. The reflecting surface 51 totally reflects the projection light P and is formed into a concaved surface or a non-spherical surface corresponding to the shape of the projection surface (not illustrated) of the windshield. The reflecting member 5 has a rotating shaft 53 for rotating the reflecting member 5 with respect to the projection light emitting unit 4. The rotating shaft 53 is formed such that both of end portions thereof project to the outer side in the width direction from both of end portions of the reflecting member 5 in the width direction. The rotating shaft 53 preferably prevents distortion that is generated by change in an information display position as a position on the windshield onto which the projection light P is projected, that is, a position on the windshield on which the information is displayed with rotation of the reflecting member 5. The rotating axis line O1 of the rotating shaft 53 may be inclined with respect to the width direction or be parallel with the width direction as long as it can prevent the distortion.

The supporting member 6 supports the reflecting member 5 such that the reflecting member 5 is rotatable. The supporting member 6 is made of metal and is fixed to the housing 2 in the internal space 24 with fixing tools, for example, screws. The supporting member 6 is a bearing that supports both of the end portions of the rotating shaft 53 such that they are rotatable. When both of the end portions of the rotating shaft 53 are inserted into bearing portions, the reflecting member 5 is rotatably supported (rotatable in the R direction) about the rotating axis line O1 (about an alternate long and two short dashes line illustrated in FIG. 2).

The rotating force generating mechanism 7 causes the reflecting member 5 to rotate and holds the reflecting member 5 at a rotation position. The rotating force generating mechanism 7 includes a driving source 71 and a driving force transmitting mechanism 72 as illustrated in FIG. 2. The driving source 71 according to the embodiment is a motor serving as an actuator and generates driving force. A controller (not illustrated) controls driving of the driving source 71 to control rotation (rotation amount and rotation direction) of the reflecting member 5. The driving force transmitting mechanism 72 is arranged between the driving source 71 and the rotating shaft 53 and transmits the driving force generated by the driving source 71 to the rotating shaft 53. The driving force transmitting mechanism 72 according to the embodiment converts the driving force generated by the driving source to rotating force for rotating the reflecting member 5. The driving force transmitting mechanism 72 holds the reflecting member 5 at a rotation position as a position in the rotation direction. In other words, the driving force transmitting mechanism 72 restricts rotation of the reflecting member 5 in a state where the driving source 71 generates no driving force. The driving force transmitting mechanism 72 according to the embodiment includes a worm gear (not illustrated) interposed between a rotating shaft of the driving source 71 and the rotating shaft 53 and the worm gear restricts the rotation of the rotating shaft 53 in a state where the driving force of the driving source 71 is not transmitted to the rotating shaft 53.

The rotating force generating mechanism 7 sets a rotatable range for the reflecting member 5. The rotating force generating mechanism 7 enables the reflecting member 5 to rotate about the rotating axis line O1 between a positive direction maximum position as a maximum position in the positive direction and a negative direction maximum position as a maximum position in the negative direction maximum position. That is to say, the entire rotatable range of the reflecting member 5 is from the positive direction maximum position to the negative direction maximum position. A reference position is set between the positive direction maximum position and the negative direction maximum position. When the reference position is assumed to be 0 degree, the positive direction maximum position is at positive several degrees (for example, 3 degrees to 3.5 degrees) from the reference position and the negative direction maximum position is at negative several degrees (for example, 1.5 degrees to 2 degrees) from the reference position. The reflecting member 5 is normally held at the reference position. The above-mentioned controller drives the driving source 71 in accordance with an operation signal from an operating unit (not illustrated) that the driver operates so as to cause the reflecting member 5 to rotate to and to be held at any desired rotation position in the entire rotatable range.

The vibration transmitting member 8 is provided between the housing 2 and the reflecting member 5 and is fixed to any one of the housing 2 and the reflecting member 5. The vibration transmitting member 8 according to the embodiment is fixed to the opposing surface 25 of the housing 2 that opposes a rear surface 52 of the reflecting member 5 at the opposite side to the reflecting surface 51 as illustrated in FIG. 4. The vibration transmitting member 8 is formed by a foamed body such as a rubber sponge, urethane foam, and polyethylene using a material having elasticity, that is, an elastically compressible and returnable material. For example, the vibration transmitting member 8 is formed by an EPT-sealer (registered trademark). The vibration transmitting member 8 is formed to have a rectangular parallelepiped shape elongated in the width direction and is fixed to the opposing surface 25 with an adhesive, a double-sided tape, or the like. The surface of the vibration transmitting member 8 that opposes the rear surface 52 corresponds to a contact surface 81 and the rectangular contact surface 81 makes contact with the reflecting member 5. The thickness of the vibration transmitting member 8 in the thickness direction (a direction in which the opposing surface 25 and the rear surface 52 of the reflecting member 5 oppose each other and a direction parallel with the center line O4 of the vibration transmitting member 8 when seen from the width direction of the reflecting member 5) is set to the thickness with which the contact surface 81 can make contact with the rear surface 52 in a state where the vibration transmitting member 8 is elastically compressed in the entire rotatable range of the reflecting member 5. Furthermore, the thickness of the vibration transmitting member 8 in the thickness direction according to the embodiment is set to the thickness with which the entire region of the contact surface 81 can make contact with the rear surface 52 in the state where the vibration transmitting member 8 is elastically compressed in the entire rotatable range of the reflecting member 5. The contact surface 81 of the vibration transmitting member 8 preferably has a high friction coefficient in order to increase friction force against the rear surface 52 of the reflecting member 5 with which the contact surface 81 makes contact. The state where the vibration transmitting member 8 is elastically compressed indicates a state where the vibration transmitting member 8 is elastically returnable and the housing 2 and the reflecting member 5 integrally vibrate with the vibration transmitting member 8. In this state, the reflecting member 5 vibrates in synchronization with vibration of the vehicle or the reflecting member 5 can vibrate in close synchronization with the vibration of the vehicle.

In the vibration transmitting member 8, as illustrated in FIG. 6 to FIG. 8, FIG. 12 to FIG. 14, and FIG. 18 to FIG. 20, when seen from the width direction of the reflecting member 5, the rotating axis line O1 of the rotating shaft 53 is located between virtual lines L1 and L2 extending in the thickness direction from both of the end portions 82 and 83 of the vibration transmitting member 8 in the direction orthogonal to the thickness direction, that is, the height direction in the entire rotatable range of the reflecting member 5. Accordingly, regardless of the rotation position of the reflecting member 5, the rotating axis line O1 as the axis line of the rotation of the reflecting member 5 does not intersect with both of the end portions 82 and 83 of the vibration transmitting member 8 in the height direction at all the time when seen from the thickness direction. When the rotating axis line O1 of the rotating shaft 53 is located between the virtual lines L1 and L2, change in an interval between the vibration transmitting member 8 and the opposing surface 25 in the height direction at the positive direction maximum position relative to the reference position or at the negative direction maximum position relative to the reference position due to the rotation of the reflecting member 5 can be suppressed in comparison with the case where the rotating axis line O1 of the rotating shaft 53 deviates from a position between the virtual lines L1 and L2. This arrangement prevents the elastically compressed state of the vibration transmitting member 8 in the height direction from changing. Vibration of the housing 2, that is, vibration of the vehicle can be therefore transmitted to the reflecting member 5 through the vibration transmitting member 8, thereby preventing the vibration of the reflecting member 5 from being different from the vibration of the vehicle.

In the vibration transmitting member 8, as illustrated in FIG. 9 to FIG. 11, FIG. 12 to FIG. 19, and FIG. 21 to FIG. 23, when seen from the height direction of the reflecting member 5, the center line O2 is located between virtual lines L3 and L4 extending in the thickness direction from both of the end portions 84 and 85 of the vibration transmitting member 8 in the direction orthogonal to the thickness direction, that is, the width direction in the entire rotatable range of the reflecting member 5. When the center line O2 is located between the virtual lines L3 and L4, change in an interval between the vibration transmitting member 8 and the opposing surface 25 in the width direction at the positive direction maximum position relative to the reference position or at the negative direction maximum position relative to the reference position due to the rotation of the reflecting member 5 can be suppressed in comparison with the case where the center line O2 is deviated from a position between the virtual lines L3 and L4. This arrangement can prevent the elastically compressed state of the vibration transmitting member 8 in the width direction from changing. Vibration of the housing 2, that is, vibration of the vehicle can be therefore transmitted to the reflecting member 5 through the vibration transmitting member 8, thereby preventing the vibration of the reflecting member 5 from being different from the vibration of the vehicle.

Next, operations of the HUD 1 according to the present embodiment will be described. The projection light P emitted from the projection light emitting unit 4 is reflected by the reflecting surface 91a of the planar mirror 9 and the reflecting surface 51 of the reflecting member 5, and is projected onto the windshield. The projection onto the windshield enables the driver to view the projection light P that has been reflected by the windshield. In this case, the driver views information corresponding to the projection light P that seems to be displayed (virtual image displayed) at the rear side relative to the windshield, that is, at the side opposite to the side viewed from the driver with respect to the windshield in accordance with a light path length of the projection light P to the windshield from the projection light emitting unit 4.

Subsequently, a rotating operation of the reflecting member 5 will be described. As described above, when the driver performs no operation on the operating unit, the reflecting member 5 is held at the reference position. When the reflecting member 5 is held at the reference position, both of the end portions of the contact surface 81 of the vibration transmitting member 8 that are located on both of the end portions 82 and 83 in the height direction when seen from the width direction make contact with the rear surface 52 of the reflecting member 5 in the state where the vibration transmitting member 8 is elastically compressed, as illustrated in FIG. 6 to FIG. 8. As illustrated in FIG. 9 to FIG. 11, both of end portions of the contact surface 81 of the vibration transmitting member 8 that are located on both of the end portions 84 and 85 in the width direction when seen from the height direction make contact with the rear surface 52 of the reflecting member 5 in the state where the vibration transmitting member 8 is elastically compressed. That is to say, when the reflecting member 5 is held at the reference position, the entire region of the contact surface 81 makes contact with the reflecting member 5 in the state where the vibration transmitting member 8 is elastically compressed.

Then, when the driver performs an operation on the operating unit so as to rotate the reflecting member 5 in the positive direction, the reflecting member 5 rotates in the positive direction from the reference position. The rotation causes the information display position on the windshield to change to the upper side (the ceiling side of a vehicle interior (not illustrated) of the vehicle) relative to the information display position at the reference position. Even when the reflecting member 5 further rotates in the positive direction and is held at the positive direction maximum position, as illustrated in FIG. 12 to FIG. 14, both of the end portions of the contact surface 81 of the vibration transmitting member 8 that are located on both of the end portions 82 and 83 in the height direction when seen from the width direction keep making contact with the rear surface 52 of the reflecting member 5 in the state where the vibration transmitting member 8 is elastically compressed. As illustrated in FIG. 15 to FIG. 17, both of the end portions of the contact surface 81 of the vibration transmitting member 8 that are located on both of the end portions 84 and 85 in the width direction when seen from the height direction keep making contact with the rear surface 52 of the reflecting member 5 in the state where the vibration transmitting member 8 is elastically compressed. That is to say, when the reflecting member 5 is held at the rotation position between the reference position and the positive direction maximum position, the entire region of the contact surface 81 keeps making contact with the reflecting member 5 in the state where the vibration transmitting member 8 is elastically compressed.

When the driver performs an operation on the operating unit so as to rotate the reflecting member 5 in the negative direction, the reflecting member 5 rotates in the negative direction from the reference position. The rotation causes the information display position on the windshield to change to the lower side (the floor side of the vehicle interior (not illustrated) of the vehicle) relative to the information display position at the reference position. Even when the reflecting member 5 further rotates in the negative direction and is held at the negative direction maximum position, as illustrated in FIG. 18 to FIG. 20, both of the end portions of the contact surface 81 of the vibration transmitting member 8 that are located on both of the end portions 82 and 83 in the height direction when seen from the width direction keep making contact with the rear surface 52 of the reflecting member 5 in the state where the vibration transmitting member 8 is elastically compressed. As illustrated in FIG. 21 to FIG. 23, both of the end portions of the contact surface 81 of the vibration transmitting member 8 that are located on both of the end portions 84 and 85 in the width direction when seen from the height direction keep making contact with the rear surface 52 of the reflecting member 5 in the state where the vibration transmitting member 8 is elastically compressed. That is to say, when the reflecting member 5 is held at the rotation position between the reference position and the negative direction maximum position, the entire region of the contact surface 81 keeps making contact with the reflecting member 5 in the state where the vibration transmitting member 8 is elastically compressed.

As described above, in the HUD 1 according to the present embodiment, the vibration transmitting member 8 makes contact with the reflecting member 5 in the elastically compressed state in the entire rotatable range of the reflecting member 5. Vibration of the vehicle, for example, vibration that is generated by acceleration, deceleration, turning, step-climbing, and the like of the vehicle is transmitted to the housing 2 and the HUD 1 vibrates in the up-down direction, the width direction, and the front-rear direction. The vibration of the housing 2 is transmitted to the reflecting member 5 not only through the rotating force generating mechanism 7 but also through the vibration transmitting member 8. When the vibration of the housing 2 is transmitted to the reflecting member 5 only through the rotating force generating mechanism 7, the reflecting member 5 does not vibrate in synchronization with the vibration of the vehicle due to the looseness and allowance (backlash) existing in the rotating force generating mechanism 7 and the reflecting member 5 vibrates in a different manner from the vibration of the vehicle. For this reason, sway of the displayed information is not synchronized with the vibration of the vehicle, resulting in lowering of visibility. On the other hand, when the vibration of the housing 2 is also transmitted to reflecting member 5 through the vibration transmitting member 8, the housing 2 and the reflecting member 5 integrally vibrate with the vibration transmitting member 8 unlike the vibration through the rotating force generating mechanism 7. That is to say, the reflecting member 5 vibrates in synchronization with the vibration of the vehicle or in close synchronization with the vibration of the vehicle, and the vibration transmitting member 8 makes contact with the housing 2 and the reflecting member 5 in the elastically compressed state. This can suppress sway of the reflecting member 5 relative to the housing 2 physically. As a result, the sway of the displayed information is synchronized with sway of the driver, thereby suppressing visibility from lowering. In the entire rotatable range of the reflecting member 5, even when the vibration transmitting member 8 keeps making contact with the reflecting member 5 in the state where the vibration transmitting member 8 is elastically compressed, the elastically compressed state of the vibration transmitting member 8 can be changed with the rotation of the reflecting member 5, thereby suppressing visibility from lowering while permitting the rotation of the reflecting member 5.

Furthermore, in the HUD 1 according to the present embodiment, the entire region of the contact surface 81 of the vibration transmitting member 8 makes contact with the reflecting member 5 in the state where the vibration transmitting member 8 is elastically compressed in the entire rotatable range of the reflecting member 5. Accordingly, the contact area between the reflecting member 5 and the vibration transmitting member 8 fixed to the housing 2 can be maximized and the maximum contact area can be kept in the entire rotatable range of the reflecting member 5. As the contact area increases, a friction surface increases between the contact surface 81 and the rear surface 52, which makes the reflecting member 5 and the housing 2 difficult to slide relatively. This can prevent, when large vibration is input to the vibration transmitting member 8 from the vehicle through the housing 2, the reflecting member 5 and the housing 2 from sliding relatively, which could make synchronization between the vibration of the reflecting member 5 and the vibration of the vehicle difficult. Consequently, this can prevent visibility from lowering.

Although the vibration transmitting member 8 is fixed to the housing 2 in the above-mentioned embodiment, the vibration transmitting member 8 is not limited thereto and may be fixed to the reflecting member 5. In this case, the vibration transmitting member 8 is fixed to the rear surface 52 of the reflecting member 5 and the entire region of the contact surface thereof opposing the opposing surface 25 of the housing 2 makes contact with the housing 2 in the state where the vibration transmitting member 8 is elastically compressed in the entire rotatable range of the reflecting member 5.

Although the vibration transmitting member 8 is provided between the rear surface 52 of the reflecting member 5 and the opposing surface 25 of the housing 2 in the above-mentioned embodiment, auxiliary vibration transmitting members that make contact with both of the end portions of the reflecting member 5 in the width direction may be provided together with the vibration transmitting member 8. The auxiliary vibration transmitting members have the same configuration as the vibration transmitting member 8 and are fixed to the surface that opposes both of the end portions of the reflecting member 5 in the width direction out of the inner wall surfaces that form the internal space 24 of the housing 2. The auxiliary vibration transmitting members causes the housing 2 and the reflecting member 5 to vibrate integrally with each other, thereby further suppressing visibility from lowering.

In a head-up display device according to the present embodiment, the vibration transmitting member makes contact with the reflecting member in the elastically compressed state in the entire rotatable range of the reflecting member. This prevents the vibration of the reflecting member from being different from the vibration of the vehicle, thereby providing an advantageous effect that suppresses visibility from lowering.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A head-up display device comprising:
    a housing that is fixed to a vehicle;
    a reflecting member that is rotatably supported by the housing and is held at a rotation position;
    a projection light emitting unit that projects projection light corresponding to information onto a window of the vehicle through the reflecting member; and
    a vibration transmitting member that is provided between the housing and the reflecting member and has elasticity, wherein
    the vibration transmitting member has a contact surface formed in a surface shape, is fixed to any one of the housing and the reflecting member, makes surface contact between the contact surface and the other one of the housing and the reflecting member, and transmits vibration of the housing to the reflecting member through the vibration transmitting member in an elastically compressed state in an entire rotatable range of the reflecting member.

2. The head-up display device according to claim 1, wherein
    an entire region of a contact surface of the vibration transmitting member makes contact with the other one of the housing and the reflecting member in the entire rotatable range of the reflecting member.

3. The head-up display device according to claim 1, wherein
    in the vibration transmitting member, when seen from a width direction of the reflecting member, a rotating axis line of a rotating shaft is located between virtual lines extending in a thickness direction of the vibration transmitting member from both of end portions of the vibration transmitting member in a direction orthogonal to the thickness direction in the entire rotatable range of the reflecting member.

4. The head-up display device according to claim 2, wherein
    in the vibration transmitting member, when seen from a width direction of the reflecting member, a rotating axis line of a rotating shaft is located between virtual lines extending in a thickness direction of the vibration transmitting member from both of end portions of the vibration transmitting member in a direction orthogonal to the thickness direction in the entire rotatable range of the reflecting member.

5. The head-up display device according to claim 1, wherein the reflecting member has such a curved shape that a center portion of the reflecting member in a width direction is close to the housing side relative to both of end portions, when seen from a height direction of the reflecting member, and in the vibration transmitting member, when seen from the height direction of the reflecting member, a center line of the reflecting member is located between virtual lines extending in a thickness direction of the vibration transmitting member from both of end portions of the vibration transmitting member in a direction orthogonal to the thickness direction in the entire rotatable range of the reflecting member.

6. The head-up display device according to claim 2, wherein the reflecting member has such a curved shape that a center portion of the reflecting member in a width direction is close to the housing side relative to both of end portions, when seen from a height direction of the reflecting member, and in the vibration transmitting member, when seen from the height direction of the reflecting member, a center line of the reflecting member is located between virtual lines extending in a thickness direction of the vibration transmitting member from both of end portions of the vibration transmitting member in a direction orthogonal to the thickness direction in the entire rotatable range of the reflecting member.

7. The head-up display device according to claim 3, wherein the reflecting member has such a curved shape that a center portion of the reflecting member in a width direction is close to the housing side relative to both of end portions, when seen from a height direction of the reflecting member, and in the vibration transmitting member, when seen from the height direction of the reflecting member, a center line of the reflecting member is located between virtual lines extending in a thickness direction of the vibration transmitting member from both of end portions of the vibration transmitting member in a direction orthogonal to the thickness direction in the entire rotatable range of the reflecting member.

8. The head-up display device according to claim 1, wherein the window of the vehicle comprises a windshield.

9. The head-up display device according to claim 1, wherein the vibration transmitting member is provided on a rear side of the reflecting member opposite to a side of the reflecting member reflecting the projection light.

10. The head-up display device according to claim 1, wherein the reflecting member is provided inside the housing.

11. The head-up display device according to claim 1, wherein the vibration transmitting member is formed of an elastically compressible and returnable material.

12. The head-up display device according to claim 1, wherein the housing vibrates in synchronization with vibration of the vehicle.

13. The head-up display device according to claim 1, wherein the surface shape is formed in a planar surface or curved surface.

14. The head-up display device according to claim 1, wherein a thickness of the vibration transmitting member in a facing direction in which the housing and the reflecting member face each other is larger than a thickness of a wall portion of the housing in the facing direction.

15. The head-up display device according to claim 1, wherein the vibration transmitting member is formed of a foamed body.

* * * * *